(12) United States Patent
Stein

(10) Patent No.: US 9,672,001 B1
(45) Date of Patent: Jun. 6, 2017

(54) INSECT DECODER AND COMMUNICATOR

(71) Applicant: Genus Ideas, Inc., Brooklyn, NY (US)

(72) Inventor: Joseph Stein, Brooklyn, NY (US)

(*) Notice: Subject to any disclaimer, the term of this patent is extended or adjusted under 35 U.S.C. 154(b) by 0 days.

(21) Appl. No.: 15/066,030

(22) Filed: Mar. 10, 2016

(51) Int. Cl.
| H04B 1/02 | (2006.01) |
| H03G 5/00 | (2006.01) |
| G06F 3/16 | (2006.01) |
| A01K 29/00 | (2006.01) |
| A01M 99/00 | (2006.01) |
| G06F 3/02 | (2006.01) |
| H05B 37/00 | (2006.01) |
| G01K 7/16 | (2006.01) |
| A01M 29/16 | (2011.01) |

(52) U.S. Cl.
CPC ............. *G06F 3/165* (2013.01); *A01K 29/00* (2013.01); *A01M 99/00* (2013.01); *G01K 7/16* (2013.01); *G06F 3/02* (2013.01); *H05B 37/00* (2013.01); *A01M 29/16* (2013.01); *A01M 2200/01* (2013.01)

(58) Field of Classification Search
CPC .......... H04S 7/307; H04R 3/04; H03G 5/165; H03G 5/025; A01M 29/16; A01M 29/18; A01M 2200/01; A01M 2200/011; A01M 2200/012
USPC .......... 381/98, 57, 124; 367/139; 340/384.2, 340/573.2
See application file for complete search history.

(56) References Cited

U.S. PATENT DOCUMENTS

| 3,683,113 A * | 8/1972 | Stewart | G08B 3/10 340/384.2 |
| 4,284,845 A * | 8/1981 | Belcher | G08B 3/10 340/384.2 |
| 6,104,283 A * | 8/2000 | Otomo | A01M 29/18 340/384.1 |
| 6,393,759 B1 * | 5/2002 | Brown | A01M 1/023 43/113 |
| 6,397,515 B1 * | 6/2002 | Brown | A01M 1/023 43/113 |
| 6,568,123 B2 * | 5/2003 | Nelson | A01M 1/023 43/107 |
| 7,173,534 B1 * | 2/2007 | Markham | A01M 31/002 340/309.16 |

(Continued)

FOREIGN PATENT DOCUMENTS

EP  0710440  *  5/1996  ............. A01N 25/16

*Primary Examiner* — Xu Mei
(74) *Attorney, Agent, or Firm* — W.R. Samuels Law PLLC; John Laurence (57) ABSTRACT

An insect decoder and communicator, comprising a user input interface, a microcontroller, a power source, a non-user input, an output interface, and a communication interface to communicate with external devices, where the user input interface, microcontroller, power source, non-user input, output interface, and communication interface are electronically connected, a preset pattern of insect communication from an external device loaded into the microcontroller through the communication interface and stored into memory, and the non-user input connected to the microcontroller and causing the microcontroller to modify the frequency of the preset patterns of insect communication produced by the output interface to accurately emulate patterns of insect communications affected by ambient temperature.

8 Claims, 6 Drawing Sheets

(56) References Cited

U.S. PATENT DOCUMENTS

| | | | | |
|---|---|---|---|---|
| 7,429,928 B2* | 9/2008 | Lee | ............ | A01M 1/24 |
| | | | | 116/22 A |
| 2008/0219460 A1* | 9/2008 | Huang | ............ | H04B 11/00 |
| | | | | 381/58 |
| 2014/0334268 A1* | 11/2014 | O'Hara | ............ | A01M 29/18 |
| | | | | 367/139 |
| 2015/0085100 A1* | 3/2015 | Raschella | ............ | A01M 31/002 |
| | | | | 348/82 |

* cited by examiner

INSECT DECODER AND COMMUNICATOR

FIELD OF THE INVENTION

The present invention relates generally to an insect decoder and communication device, and, more specifically, to an insect decoder and communication device that transmits information specific to an insect species through communicative means, such as light and sound, to attract insects of that species.

BACKGROUND

It is well known that insects communicate with one another and with other orders, suborders, or families of insect through various modes of communication. These modes may include tactile, chemical, acoustic, or visual communications.

The manner of communication used by an insect normally increases or decreases in frequency, duration, and periodicity in direct relationship to ambient temperature where that insect is located. This phenomenon is known as the Q10 coefficient. The Q10 coefficient is a measure of the temperature sensitivity of an enzymatic reaction rate or a physiological process, including a biological or chemical system, due to an increase of 10 degrees centigrade.

It is possible to attract a specific species of insect by imitating its communication patterns using light or sound sources that emit at roughly the same frequency. Existing insect decoder and communicator devices simply display a preset pattern in an effort to communicate with or attract an insect. However, these existing devices fail to take into account various ambient factors, including temperature and sound amplitude (commonly known as loudness). These ambient factors are known to affect the methods and manners in which insects communicate with one another, including changes to the frequency, duration, and periodicity of the communications. By not taking into account ambient factors, existing insect decoder and communicator devices do not efficiently communicate or attract the specific insect the user seeks to attract, which can lead to undesirable results for the user.

What is in needed is an insect decoder and communicator device that is designed to imitate the communication patterns of any insect species by uploading or creating a pattern file for that specific insect species into the device. While utilizing the pattern file, the device is equipped with the appropriate peripherals which allow it to accurately mimic how insects communicate with other insects, including modification of the preset pattern due to ambient factors. The ability to upload new patterns to the device is useful for scientific research in those parts of the world, such as the neo tropics, where many insect species have yet to have their mating patterns described as well as for verifying the extents of home ranges and behaviors for known species. In addition, it allows for users of the insect decoder and communicator device, including scientists, to quickly change the species of insect they are attempting to attract.

Moreover, what is needed is an insect decoder and communicator device that takes into account ambient factors, like temperature and sound amplitude, which are known to affect insect communications. By taking these factors into account, the insect decoder and communicator device is more capable of adapting to environments where a specific species of insect may be located and mimic how that insect would communicate.

BRIEF SUMMARY

The present invention seeks to solve the above-described problems by disclosing an insect decoder and communicator device comprised of a user input interface, a microcontroller, a power source, a non-user input, an output interface, and a communication interface to communicate with external devices. The microcontroller, power source, user input interface, output interface, and non-user-input are electronically connected to one another. A preset pattern representative of insect communications from an external source is loaded into the microcontroller through the communication interface and stored into the memory of the insect decoder and communicator. The non-user input causes the microcontroller to modify the frequency of the preset patterns of insect communication produced by the output interface to accurately emulate patterns of insect communications affected by ambient temperature.

In another aspect of the invention, the preset patterns of insect communication are stored in an external device, such as a written field guide, a mobile device, or a computer. The preset patterns of insect communication are for a particular species of insects. The present pattern reflects the communication pattern of that particular species of insect at the baseline ambient temperature.

In yet another aspect, the non-user input causes the microcontroller to modify the frequency of the preset patterns of insect communication produced by the output interface to accurately emulate patterns of insect communications affected by ambient temperature. The microcontroller modifies the frequency of the preset pattern of insect communication to reflect the change of a particular species of insect affected by ambient temperature in accordance with the Q10 coefficient.

These and other features of the present invention will become readily apparent upon further review of the following specification and drawings.

DETAILED DESCRIPTION

Figure 1:
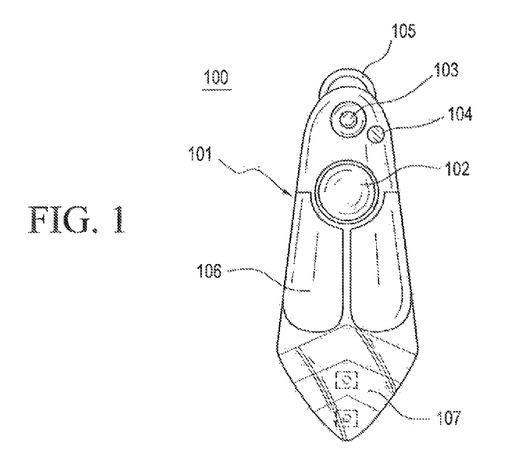
FIG. 1 shows a front view of the insect decoder and communicator.

Referring now to the figures, FIG. 1 shows a front view of an insect decoder and communicator device according to a preferred embodiment of the present invention. As shown in FIG. 1, the front of the insect decoder and communicator device 100 is comprised of a selector switch 101, a start/stop button 102, a manual record start/stop button 103, an indicator 104, a ring attachment 105, a device body top 106, and an output communicator 107.

A device according to a preferred embodiment of the present invention is able to communicate with a species of insect capable of visual or acoustic communication, including light flash patterns or audio signals emanated from the output communicator 107. The device body top 106 is created using injection molded plastic and is shaped to resemble an insect. However, the present invention also encompasses a device body top 106 made of any other suitable material and made into any other suitable shape. One of skill in the art will appreciate that the device body top 106 can be manufactured or created using other known methods.

The selector switch 101, start/stop button 102, and manual record start/stop button 103 can be in the form of a rotary switch, stepping switch, push-button switch, tactile switch, or toggle switch.

The indicator 104 can be in the form of a light-emitting diode, incandescent bulb, or any other appropriate form of a light emitting device known to one of reasonable skill in the art. The indicator 104 is used to visually communicate device information to the user of the insect decoder and communicator 100, such as whether or not data was successfully transferred to the insect decoder and communicator device 100.

The ring attachment 105 may be U-shaped, annular, or substantially U-shaped and is connected to the insect decoder and communicator device 100 through the device body top 106. The ring attachment 105 is used to connect the insect decoder and communicator device 100 to another peripheral, such as a string or key chain ring. The ring attachment 105 is sufficiently thin to permit the winding of a key chain ring, necklace, or string to fit with the gap between the ring attachment 105 and device body top 106.

The output device 107 provides a means for generating an output signal, the output signal including audio signals and optical signals depending on the type of insect the insect decoder and communicator 100 is attempting to attract. The means for generating the output signal may include an acoustic transducer for audio signals an electro-optical transducer for optical signals.

When emitting an audio signal, the output device 107, may emit audio frequencies audible to humans as well as frequencies inaudible to humans. The output device 107, as an acoustic transducer, may be in the form of a speaker, including a piezoelectric speaker, a magnetostrictive speaker, a ribbon/planar magnetic speaker, or any other appropriate form of an audio emitting device known to one of reasonable skill in the art.

When emitting an optical signal, the output device 107 may generate optical signals within the spectrum of light visible to humans as well within the spectrum of light not visible to humans, including infrared and ultraviolet light. The output device 107, as an electro-optical transducer, may be in the form of a light-emitting diode, an incandescent bulb, an ultraviolet light-emitting diode, a black light, a short wave ultraviolet lamp, an infrared lamp, an infrared light-emitting diode or any other appropriate form of a light emitting device known to one of reasonable skill in the art.

The selector switch 101 selects between different modes to display an audio or visual communication through the output device 107. In a preferred embodiment, the insect decoder and communicator device 100 has four modes which are activated depending on the position of the selector switch 101. It would be obvious to one reasonably skilled in the art that the selector switch 101, the start/stop button 102, and other buttons on the insect decoder and communicator 100, can allow for additional functionality through traditional software remapping of the buttons. Such software remapping of the buttons on the insect decoder and communicator 100 can include additional functionality and modes, such as allowing for pressure sensitivity which can alter the amplitude of the signal communicated through the insect decoder and communicator 100, or to allow for quick change of the pattern from one species of insect to another with each button.

In an alternative embodiment, the insect decoder and communicator device 100 need not have a physical selector switch 101 to select a corresponding mode. Instead, the insect decoder and communicator device 100 can utilize the photo reflector (not shown), USB Port (not shown), and/or a wireless communication port (not shown) to receive data from another source which can alter the mode the insect decoder and communicator device 100 is in. Using these various input ports, the microcontroller (not shown) controlling the insect decoder and communicator device 100 is capable of receiving data from another source, such as a cellular telephone, smartphone, tablet, laptop and computer screens, or a static document which has a barcode. The data from the other source can modify the mode selected in the insect decoder and communicator device 100.

Figure 2:
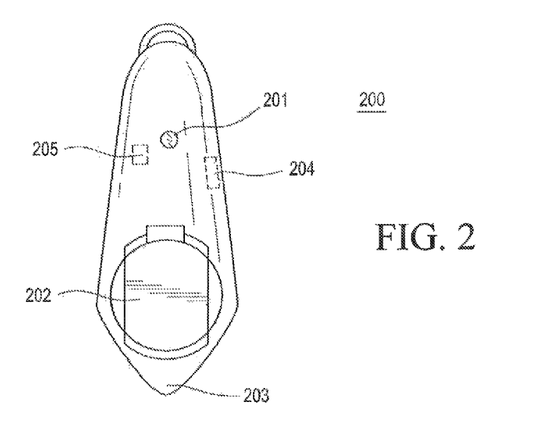
FIG. 2 shows a perspective view of the rear portion of the insect decoder and communicator.

In FIG. 2, a perspective view of the rear portion of the insect decoder and communicator device is shown. The rear portion of the insect decoder and communicator device 200 includes an optical sensor 201, a battery holder 202, a FOB body bottom 203, a USB port 201, and a wireless communication port 205.

As above-described in FIG. 1 for the device body top 106, the device body bottom 203 is created using injection molded plastic and is shaped to resemble an insect. However, the present invention also encompasses a device body bottom 203 made of any other suitable material and made into any other suitable shape. One of skill in the art will appreciate that the device body bottom 203 can be manufactured or created in different methods to achieve the objectives of the invention.

The optical sensor 201 is an input device used to provide data and control signals into the insect decoder and communicator device 200. The optical sensor 201 can function as a barcode reader or scanner, which enables the insect decoder and communicator device 200 to receive data from a static or dynamic barcode. In addition, the optical sensor 201 is capable of receiving dynamic light communications directly from a monitor, screen, or other light source which is running software on a device, such as a cellular telephone, smartphone, tablet, or laptop and computer screens. In such instances, the optical sensor 201 can be in the form of a photoresistor, phototransistor, photodiode, or any other component that has photoconductive properties known to one reasonably skilled in the art.

The battery holder 202 is electronically connected to the electrical components within the insect decoder and communicator device 200, including the output device 107 (not shown). The battery holder 202 holds the battery which powers those electrical components within the insect decoder and communicator device 200. In the described preferred embodiment, the battery holder 202 holds a 20 mm diameter 3 VDC 120 mA battery (not shown). As such, the battery holder 202, is a 20 mm diameter coin cell holder. It would be obvious to one reasonably skilled in the art that the battery holder 202 and battery may vary in size and shape depending on the required electrical input necessary to run all of the components of the insect decoder and communicator device 200, including the output device 107 (not shown).

In another embodiment, the battery holder 202 may consist of a rechargeable battery. The battery (not shown) within the battery holder 202 can be formed from a multitude of different electrochemical cells which are well known in the art such as nickel-cadmium, nickel-metal hydride, lithium-ion, lithium-ion polymer, lithium sulfur, and potassium-ion. The electrochemical cells can be rechargeable via an external power source, including through a USB Port or an AC/DC plug (not shown). The battery (not shown) and the battery holder 202 can vary in size and shape depending on a multitude of factors, including the size of the insect decoder and communicator device 200 and the required electrical input necessary to run all of the components of the insect decoder and communicator device 100.

The USB Port 204 is used to establish a computer bus connection for communication and power supply between computers, electric sources, and/or electronic devices, including the battery holder 202, battery (not shown), microcontroller (not shown), output device (not shown), and other electrical components of the insect decoder and communicator 200. The USB Port 204 can be in the form of a Micro-A plug, Micro-B plug, Mini-A plug, Mini-B plug, Standard-A plug, or Standard B-plug. In addition the USB Port 204 can be in the form of other proprietary computer bus and power connectors, including a UC-E6 plug, a 30-pin connector, and a lightning connector.

The wireless communication port 205 is used to establish a transfer of information between two or more points that are not connected by an electrical conductor. The wireless communication port 205 is generally in the form of a wireless networking device utilizing radio communication (including microwave communication), free-space optical communication, sonic communication, and electromagnetic induction. The wireless communication port 205 can include both a receiver (not shown) and transmitter (not shown) enabling the insect decoder and communicator 200 to both receive and send information to a peripheral device, such as a computer, mobile cellular telephone, or portable computing device with a similar wireless communication port. One of skill in the art will appreciate that the wireless communication port 205 can be employed in different methods to achieve the objectives of the invention, including utilizing common technologies know in the art like Bluetooth, Wi-Fi, and Near field communications to enable the insect decoder and communicator 200 to transfer information to and from another computing device.

Figure 3:
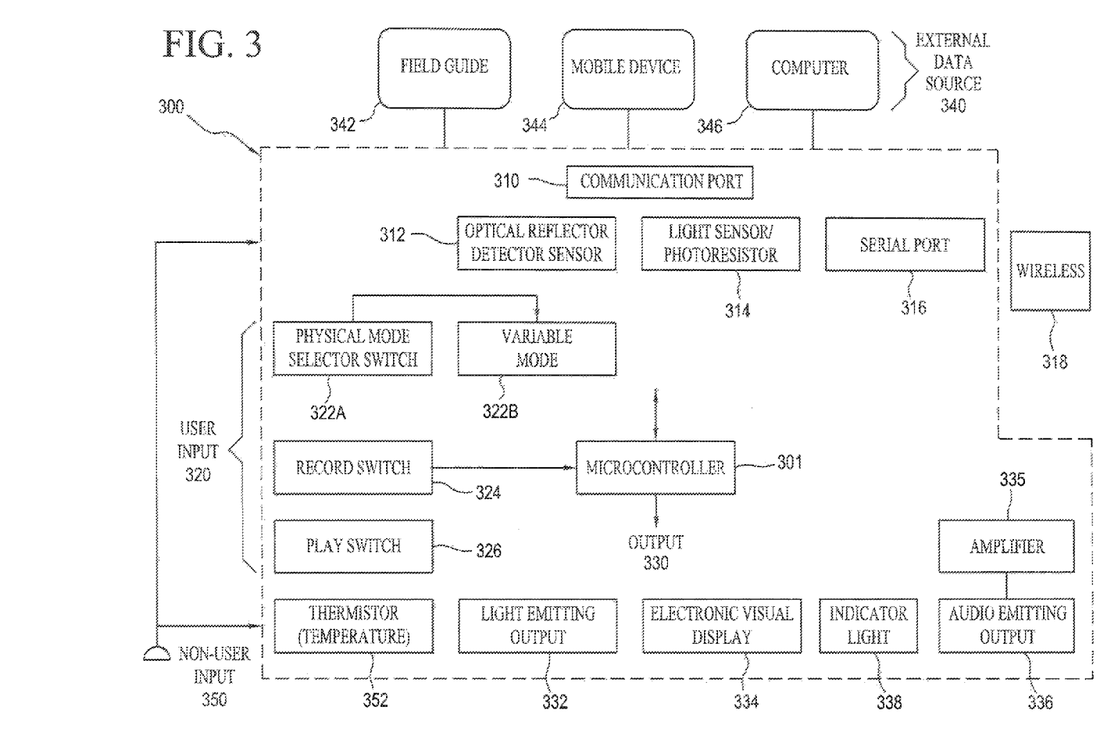
FIG. 3 shows an exemplary computing infrastructure for an insect decoder and communicator device according to the present invention.

In FIG. 3, an exemplary infrastructure for an insect decoder and communicator device according to the present invention is shown. As shown in FIG. 3, the infrastructure 300 of the insect decoder and communicator device is comprised of a microcontroller 301, a communications port 310, a user input interface 320, an output interface 330, and a non-user input interface 350.

The microcontroller 301 is a small computer containing a processor core, memory, and programmable input/output peripherals on a single integrated circuit. The microcontroller 301 can feature a central processing unit, volatile memory for data storage (RAM), ROM or Flash memory, serial input/output ports, and other peripherals. A person of reasonable skill in the art will understand that other components may be included or excluded from the single integrated circuit of the microcontroller 301.

The communications port 310 allows the insect decoder and communicator device to receive and transmit data from external data sources 340. The communications port 310 is electronically connected to the microcontroller 301. As such, data gathered by the communications port 310 from the external data sources 340 may be processed and stored within the microcontroller 301.

The communications port 310 may include an optical reflector detector 312, a light sensor/photo transistor 314, a serial port 316, and/or a wireless communication interface 318. The optical reflector detector 312 can be in the form of a barcode reader or barcode scanner, which may consist of a light source (not shown), a lens (not shown), a light sensor (not shown) that translates optical impulses into electrical impulses. The optical reflector detector 312 can also be in the form of a camera.

The light sensor/photo transistor 314 can also be used as an input device allowing the insect decoder and communicator device to receive data from external data sources 340. Use of the light sensor/photo transistor 314 is a non-traditional method for transmitting serial information from a screen of a mobile device, such as a cellular telephone, smartphone, table, or stationary monitors such as laptop and computer screens, to the insect decoder and communicator device. One of skill in the art will appreciate that the light sensor/photo transistor 314 can also be in the form of a photo resistor, phototransistor, photodiode, or any other component which has photoconductive properties known to one reasonably skilled in the art.

In addition, the light sensor/photo transistor 314 can be used to record visual communication displayed by an insect that the user has encountered. By selecting the appropriate mode, the light sensor/photo transistor 314 can record visual communication emitting by an insect and store the pattern in the microcontroller's 301 memory. This pattern can then be uploaded from the insect decoder and communicator device to an external data source 340 for later use. Furthermore, the recorded pattern can be compared to preset patterns already within an external data source 340 to identify the species of insect the user encountered.

The serial port 316 is a physical serial communication interface which transfers information in or out one bit at a time. The serial port 316 can be in the form of a Universal Serial Bus port (USB), an Ethernet port, or a FireWire port. The serial port 316 can be either a male or female port permitting a physical communication interface with another device, such as a personal computer, a tablet, or a cellular telephone. A person of reasonable skill in the art will understand that the serial port 316 may be in any form which permits the insect decoder and communicator device to have a physical serial communication.

The serial port 316, in addition to being capable of transferring information in or out of the insect decoder and communicator device, may also act as an electrical power input to charge or recharge a rechargeable battery (not shown) within the insect decoder and communicator device. The serial port 316 can be electrically connected to the battery which is mounted within the insect decoder and communicator device.

The wireless port 318 allows for wireless communication between the insect decoder and communicator device and external data sources 340. The wireless port 318 allows for the transfer of information in or out of the insect decoder and communicator device and external data sources 340. The wireless port 318 may be in the form of a Bluetooth or Wireless USB device. A person of reasonable skill in the art will understand that the wireless port 316 may be in any form which permits the transfer of information between two or more points without the necessity of an electrical conductor between said points.

The user input interface 320 is electronically connected to the microcontroller 301. The user input interface 320 may include a mode selector, a record switch 324, and a start/stop switch 326. The mode selector may be in the form of a physical mode selector switch 322A, or can be a mode variable 322B which is modifiable by an external data source 340. The physical mode selector switch 322A, the record switch 324, and the start/stop switch 326 require the user to activate these switches in order to cause the insect decoder and communicator device to perform a function. In other embodiments, the insect decoder and communicator device need not have a physical mode selector switch 322A, as the mode variable 332B is stored and controlled by the microcontroller 301 which can be modified by an external data source 340 or by a user through the electronic visual display 334.

The output interface 330 is electronically connected to the microcontroller 301. The output interface 330 may be comprised of a light emitting output 332, an electronic visual display 334, an audio emitting output 336, or an indicator light 338. The audio emitting output 336 can be electronically connected to an amplifier 335. The electronic visual display 334 can be in the form of a flat panel display, including a liquid crystal display, light emitting diode display, or an interferometric modulator display. A person of reasonable skill in the art will understand that the electronic visual display 334 may be in any form which permits the display of information transmitted electronically. The indicator light 338 can be in the form of light-emitting diode, incandescent bulb, or any other light emitting mechanism generally known in the art.

The output interface 330 can also act as a device permitting communication between the insect decoder and communicator device and an external data source 340. Specifically, external data sources 340, such as a mobile device 344 or a computer 346, with an onboard camera or microphone capable of capturing the output interface 330, specifically, the light emitting output 332 or the audio emitting output 336 signals and software to process those signals can be utilized to facilitate communication between the insect decoder and communicator device 330 and an external data source 340.

The non-user input interface 350 is electronically connected to the microcontroller 301. The non-user input port 350 may include a thermistor 352. The thermistor 352 measures and reacts to the ambient temperature surrounding the insect decoder and communicator device.

In an alternate embodiment, the communications port 310, specifically the light sensor/photo transistor 314 can be utilized by the insect decoder and communicator device as a non-user input interface 350 to measure ambient light surrounding the insect decoder and communicator device.

The insect decoder and communicator device gathers data from an external data source 340, which affects the output signal generated by the insect decoder and communicator device. The external data source 340 may be comprised of a field guide 342, a mobile device 344, or a computer 346.

The field guide 342 may be in the form of a physical book which is comprised of static barcodes, each of which provides pattern information for a specific genus of insect.

A static bar code from the field guide 342 containing pattern information for a specific genus of insect is read using the optical reflector detector 312 within the insect decoder and communicator device. The output of the optical reflector detector 312 is then processed by the microcontroller 301 so as to extract the pattern information which will be used by the output device within the insect decoder and communicator device 100 to generate an output signal that is specific to a genus of insect corresponding to the static bar code.

The field guide 342 may also be in the form of an Internet Website which compiles various bar codes for individual genus of insects and that displays a selected individual bar code on a computer 346 monitor or on the screen of a mobile device 344. Using the optical reflector detector 312, the user may scan the bar code that is displayed on the monitor or screen of the mobile device 344 or computer 346. In addition, a computer 346 can be used to download new patterns from an Internet Website containing information for an individual genus of insect and, through the serial port 316 or wireless port 318 upload that pattern information into the microcontroller 301.

In this particular embodiment, any bar code in the external data source 340, including the field guide 342 is encoded in the Code 39 symbology known in the art. One of skill in the art will appreciate that the bar codes within the field guide 342, mobile device 344, or computer 346 can be employed in different methods to achieve the objectives of the invention, including utilizing common barcode symbology's know in the art like Codebar, Code 25, Code 11, Code 49, Code 93, Code 128, EAN 2, EAN 5, EAN-8, EAN-13, GS1-128, GS1 Databar, ITF-14, JAN, MSI, Plessey, Telepan, and Universal Product Code.

The mobile device 344 or computer 346 can have a software application installed on the mobile device 344 or computer 346. The software application (not shown) can consist of a database or log files with pre-set patterns organized by species and gender of insect. The software application's user interface would permit a user of the mobile device 344 or computer 346 to select the pattern they wish to upload onto the insect decoder and communicator device. In addition, the software application is capable of downloading new patterns from a predetermined source from the Internet, such as a file from a server or an XML feed. In addition, the software application is capable of reprogramming and modifying how the insect decoder and communicator device operates, including the ability to change the insect decoder and communicator device's mode. Furthermore, the software application is capable of receiving new patterns created by a user from the insect decoder and communicator device, allowing users to save patterns created by them for later use.

The mobile device 344 or computer 346 would run the software application, which then connects to the Internet, and the mobile device 344 or computer 346 allows the user to select individual genus of insect it seeks to attract from a database or log files containing the corresponding patterns. Upon selection of the individual species and gender of insect by the user, the software application installed on the mobile device 344 will display the appropriate bar code on the mobile device 344 monitor, enabling the user to scan that bar code with the insect decoder and communicator device.

In another embodiment, when the user selects a species and gender of insect or mode, the mobile device 344 or computer 346 will begin transmitting a pattern of rapidly changing light and dark images on its corresponding monitor or screen, which mimics the scannable strip of black bars and white spaces in a static bar code. In this particular embodiment, the light sensor/photo transistor 314 will capture the pattern of rapidly changing light and dark images and calculate the desired insect communication pattern accordingly.

In this particular embodiment, when the user selects a species and gender of insect or mode in the software application, the mobile device 344 or computer 346 transmits a particular species and gender of insect pattern information via wireless communications, such as Bluetooth connectivity or near field communications technology from mobile device 344 or computer 346 to the insect decoder and communicator device.

In addition, a user can connect mobile device 344 or computer 346 to the insect decoder and communicator device using a physical connection through the serial port 316. Once a physical serial communication connection is established between the mobile device 344 or computer 346 and the serial port 316, the user can upload pattern information of a particular species and gender of insect pattern into the insect decoder and communicator device 100 or modify the device's mode. In addition, the physical serial communication connection also enables the user to upload pattern information from the insect decoder and communicator device to the software running on the mobile device 344 or computer 346. The software running on the mobile device 344 or computer 346 will provide features which allow users to download patterns created by the user on the insect decoder and communicator device and save those patterns for future use.

The insect decoder and communicator device computing infrastructure 300 can be turned on by any of the user input interface 320 buttons. In this particular embodiment, when activated, the play switch 326 causes the microcontroller 301 to turn on if the microcontroller 301 is currently off. The microcontroller 301, and in turn the insect decoder and communicator device computing infrastructure 300, turns off when the microcontroller 301 does not receive any input signals from the user input interface 320 or communications port 310 for a predetermined amount of time. One skilled in the art can appreciate that pressing and holding any combination of the user input interface 320 buttons simultaneously for a preset amount of time can put the device to sleep.

Once the microcontroller 301 is turned on, the microcontroller 301 will automatically begin receiving inputs from the non-user input port 350, including the thermistor 352. The thermistor 352 provide the microcontroller 301 information regarding the ambient temperature, which is used by the microcontroller 301 to affect the frequency and periodicity of a pre-set pattern loaded into the microcontroller 301 and the output interface 330.

Depending on which mode the mode selector 322A, 322B is currently on, the insect decoder and communicator device computing infrastructure 300 will behave differently by seeking different inputs at different times.

Figure 4A:
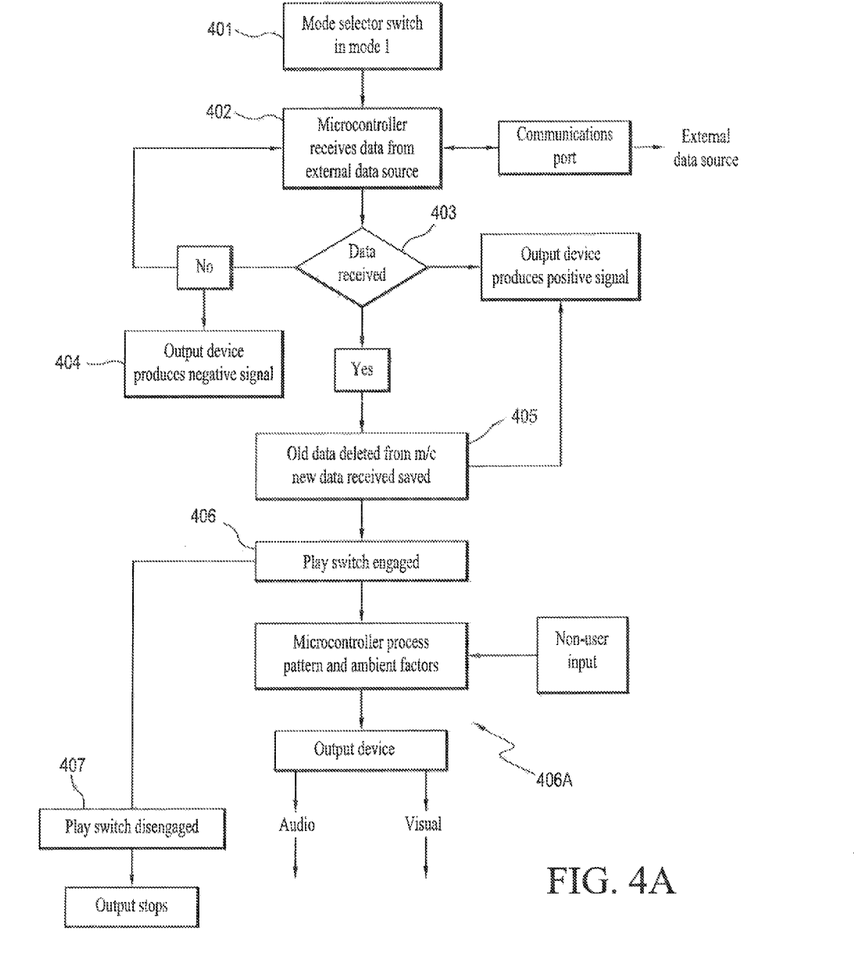
FIG. 4A is a flowchart representation of the operation of the insect decoder and communicator device when it is on mode "one"

FIG. 4A is a flowchart representation of the operation of a preferred embodiment of the insect decoder and communicator device when the mode selector is on mode "one." Operation begins in step 401 with the physical mode selector or the variable mode is in mode "one." In step 402, the user selects the record switch which causes the insect decoder and communicator device to begin receiving data from an external data source through the communications interface. In step 403, it is determined whether data has been received through the communications interface. If data is unsuccessfully received, the output device will proceed to step 404 in which the insect decoder and communicator device provides the user a negative signal (in the form of a visual light or audible prompt) through the output interface and will return to step 402. If the data is successfully received in step 403, it will proceed to step 405 where the output interface will provide an audible or visual signal advising the user that the data transmission was successful, the microcontroller will no longer search for data from the communications interface, any previous pattern stored in memory will be deleted, and the new pattern will be stored in the microcontroller's memory. In step 406, the user activates the play switch, which causes the microcontroller to process the uploaded pattern and emit the pattern through the output interface. While step 406 is ongoing, step 406A continuously occurs. In step 406A, the microcontroller receives information from the non-user input port (such as ambient temperature), and will modify the loaded pattern in accordance with the preset formula described below. In step 407 where the user activates the play switch to stop the playback of the recorded pattern.

Figure 4B:
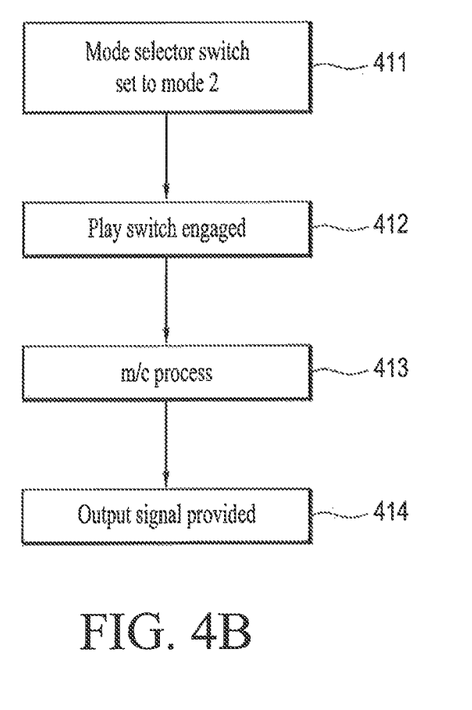
FIG. 4B is a flowchart representation of the operation of the insect decoder and communicator device when it is on mode "two"

FIG. 4B is a flowchart representation of a preferred embodiment of the insect decoder and communicator device when the mode selector is on mode "two." In mode "two" the user directly controls the output interface by pressing a corresponding button. When the button is engaged, the output interface is active. When the button is disengaged, the output interface is inactive. In this particular embodiment, in step 411 the mode selector switch is set to mode "two" and no input is accepted from the communications interface, or from the non-user input. In step 412, the user activates the play switch, which causes the microcontroller to simultaneously emit an output signal from the output interface 413. When the play switch is no longer activated, there is no output from the output interface 414. As such, the play switch directly controls when the output interface emits a signal.

Figure 4C:
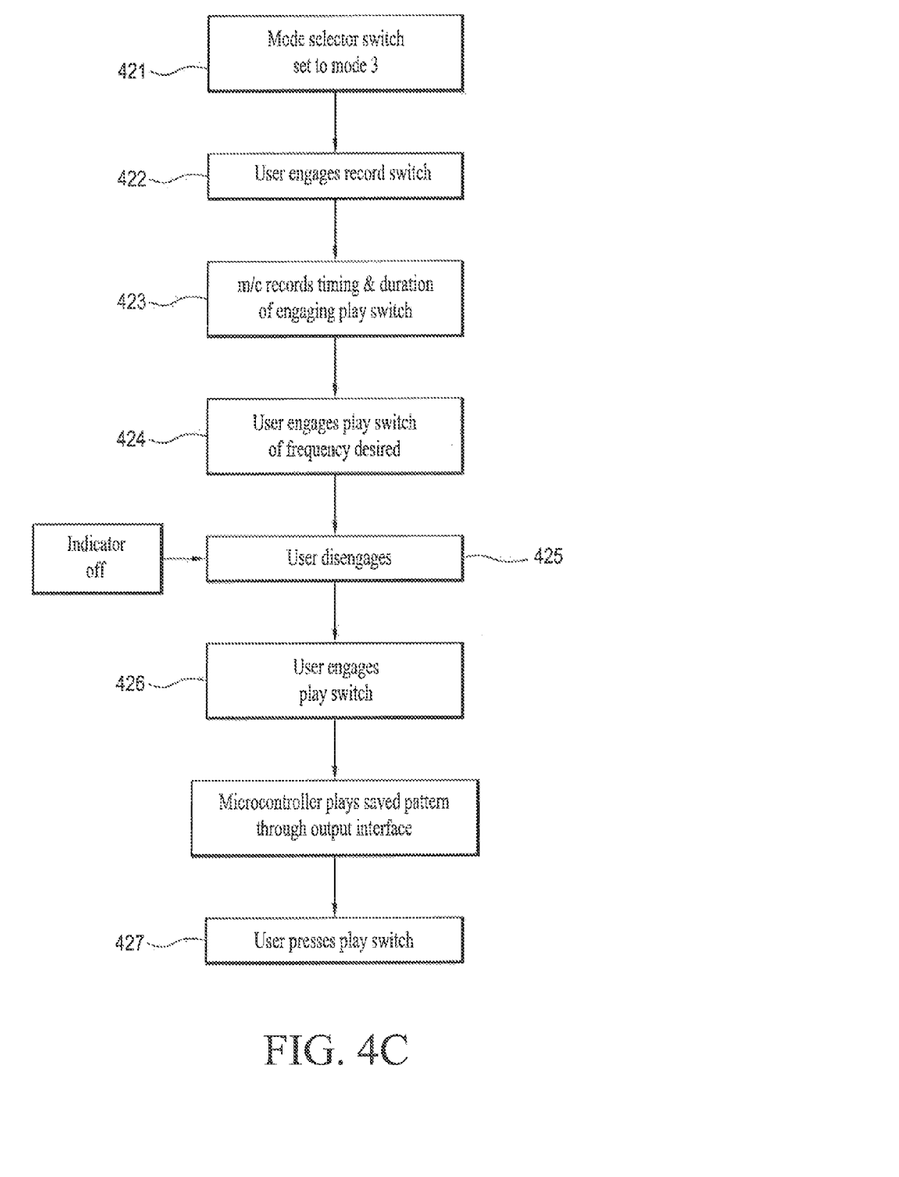
FIG. 4C is a flowchart representation of the operation of the insect decoder and communicator device when it is on mode "three"

FIG. 4C is a flowchart representation of a preferred embodiment of the insect decoder and communicator device when the mode selector is on mode "three." Mode "three" allows a user to create their own patterns of light or sound, which the insect decoder and communicator device will store into memory and replay when prompted by the user. In this particular embodiment, in step 421 the mode selector is set to mode "three." The microcontroller does not receive any input from communications interface or from the non-user input. In step 422, the user activates the record switch, and the output interface provides a signal (audible or visual) that informs the user that the record switch was activated and that the microcontroller is recording a pattern. In step 423 the microcontroller records the timing of when the play switch is engaged and disengaged by a user. In step 424, the user presses the play switch in a pattern that is desired by the user while simultaneously outputting that pattern through the output interface. In step 425, the user engages the record switch which causes the microcontroller to stop recording and the pattern is stored into the microcontroller's memory. At the same time, the output interface is deactivated to provide the user a signal that the insect decoder and communicator device is no longer recording. In step 426, the user presses the play switch to output the new recording through the output interface. In step 427, the user presses the play switch to stop the playback of the recorded pattern.

Figure 4D:
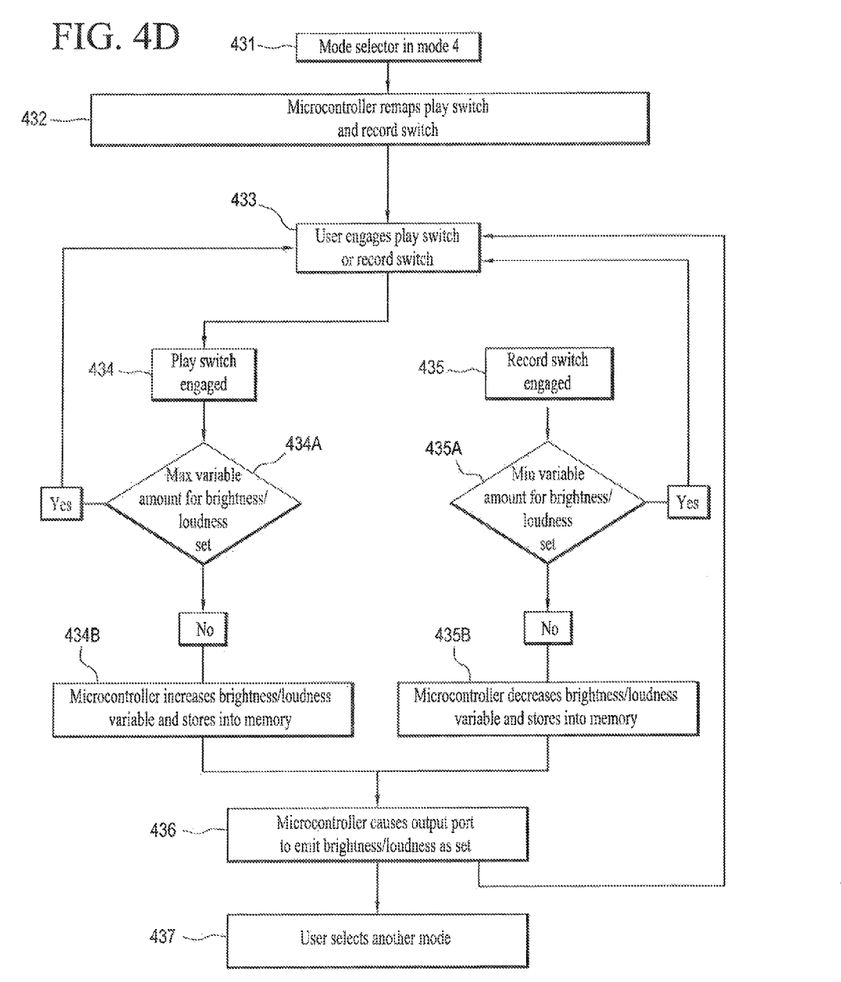
FIG. 4D is a flowchart representation of the operation of the insect decoder and communicator device when it is on mode "four"

FIG. 4D is a flowchart representation of a preferred embodiment of the insect decoder and communicator device when the mode selector is on mode "four" which allows the user to modify the brightness or loudness of the output port. In this particular embodiment, in step 431 the mode selector is set to mode "four." In step 432, the microcontroller remaps the play switch and record switch to perform different functionality. The loudness or brightness of the output port defaults to a standard of fifty (50) percent of the loudness or brightness that the output port is capable of. In particular, the play switch is remapped to increase the brightness or loudness of the output port and the record switch is remapped to decreases the brightness or loudness of the output port. In step 433, the user of the insect decoder and communicator device can either engage the play switch or record switch. In step 434, the user presses the play switch to increase the brightness or loudness of the output port. In step 434A, the microcontroller determines whether the variable controlling the output port has reached its maximum output (i.e., one-hundred percent). If the microcontroller determines that the variable controlling the output port is at its maximum value, the microcontroller does not modify the variable. If the variable is below the maximum value, step 434B takes place in which the microcontroller will increase the variable controlling the brightness and loudness variable and stores it within its memory. After storing the new variable, step 434C causes the microcontroller will cause the output port to display or play a light or sound to show the user the newly modified brightness or loudness.

In step 435, the user presses the record switch to decrease the brightness or loudness of the output port. In step 435A, the microcontroller determines whether the variable controlling the output port has reached its minimum output (i.e., zero percent). If the microcontroller determines that the variable controlling the output port is at its minimum value, the microcontroller does not modify the variable. If the variable is above the minimum value, step 435B takes place in which the microcontroller will decrease the variable controlling the brightness and loudness variable and stores it within its memory. After storing the new variable, step 436 causes the microcontroller will cause the output port to display or play a light or sound to show the user the newly modified brightness or loudness.

A user is free to repeat steps 433 and correspondence steps 434 through 435 until a desired brightness or loudness of the output port is captured.

In step 437, once the user reaches the desired brightness or loudness of the output port, the user can then modify the mode selector to any other mode the user desires. This causes the microcontroller to remap the play switch and record switch to their original functionality. When a user then engages any of the user input interface, the variable for the output port brightness or loudness selected in mode 4 will apply to all other modes and the output port output in any other mode.

Referring back to FIG. 3, it is obvious to one reasonably skilled in the art that the different components of the insect decoder and communicator device computing infrastructure 300 can be activated when selecting different modes on the mode selector switch 322. It is also obvious to one reasonably skilled in the art that the memory with the microcontroller 301 can store multiple patterns which a user can select from using the electronic visual display 334 that displays information to identify the pattern, including the name and/or image of the specific genus, species, and gender of insect. In addition, it is obvious to one reasonably skilled in the art that the insect decoder and communicator device functionality, including operation and selection of modes, can be selected using the electronic visual display 334 that displays information regarding the insect decoder and communicator device modes and other functionality.

It is well known in the art that the frequency of insect communication, including visual and acoustic communication is affected by the ambient temperature where the insect is located. For example, Dolbear's Law states the relationship between the air temperature and the rate at which crickets chirp—the higher the temperature, the more frequent the cricket chirp is, while a lower temperature coincides with a lesser frequency of cricket chirping. The ability to modify the pre-set patterns of acoustic or visual communication emitted through the output interface 330 enables the insect decoder and communicator device to adapt and more accurately emulate insect acoustic and visual communication in that particular environment.

The Q10 temperature coefficient is a measure of the rate of change of a biological or chemical system. The Q10 temperature coefficient is calculated as $(R2/R1)^{10/(T2-T1)}$ where R is the rate and T is the temperature in Celsius. R2 and T2 represent the values of the biological/chemical systems rate (R2) at temperature (T2). R1 and T1 represent the values of the biological/chemical system rate (R1) at another temperature different from T2 (T1). For most biological systems, the standard Q10 coefficient is around approximately 2-3. For illustrative purposes for applying the Q10 formula, assume that an insect produces a visual communication at a rate of 12 flashes per minute at a temperature of 24.5 degrees Centigrade. These would represent R2 and T2 respectively. Then, assume the same insect produces a visual communication at a rate of 10 flashes per minute at a temperature of 22.5 degrees Centigrade. These values would represent R1 and T1 respectively. Applying the Q10 coefficient formula provided above, the Q10 coefficient ratio for this example would be 2.48.

Application of the Q10 coefficient requires observation of a species rate of a biological process at two different temperatures. Since most insects are observed in the field, there generally is insufficient information to properly calculate the Q10 coefficient in order to properly modify the frequency of a visual or acoustic communication pattern. Through observation and experimentation of insects and their rate of visual or acoustic communication at different temperatures, it was possible to create a formula to calculate the frequency of the communication at varying temperatures without the necessity of having to observe an insect at two differing temperatures and measuring the rate of communication.

Observation of each species of insects, including their gender, visual or acoustic communication at a baseline temperature of 24.5 degrees Centigrade, or 76.1 degrees Fahrenheit, produces the baseline pattern. These patterns at the baseline temperature is then encoded in the external data source 340 in a manner which enables the insect decoder and communicator device to receive and utilize the pattern information.

Patterns uploaded onto the insect decoder and communicator device from an external data source 340 are provided at pre-set rate of output which ultimately affects the frequency of the signal produced by the output interface 330. The pre-set rate of pattern consists of timing and duration of when a signal (regardless of whether the signal is acoustic or visual) from the output interface 330 is active and inactive. In the current embodiment, the pre-set rate of output is set at a baseline which reflects the rate that a particular insect would produce acoustic communication or visual communication at an ambient temperature of 24.5 degrees Centigrade, or 76.1 degrees Fahrenheit. The pre-set rate of patterns are manually created and entered into the external data source 340. The pre-set rate of patterns discovered and created through scientific observation, research, or experimentation of patterns at the baseline temperature for each specific insect, along with its species and gender. The pre-set rate of pattern is created to emulate the visual or acoustic communications patterns that each specific insect (including their species and gender) at the baseline temperature of 24.5 degrees Centigrade, or 76.1 degrees Fahrenheit.

The rate of a pattern, regardless of whether the output is acoustic or visual, emitted through the output interface 330 is initially set at a baseline provided in the external data source 340. This baseline pattern emulates the rate that a particular insect would normally produce such audio or visual communication at 24.5 degrees Centigrade, or 76.1 degrees Fahrenheit. Depending on ambient factors, such as air temperature surrounding the insect decoder and communicator device, the microcontroller 301 will alter and modify the pre-set rate of output frequency emitted through the output interface 330. Indeed, if the ambient temperature captured by the thermistor 352 is above or below the baseline temperature of 24.5 degrees Centigrade, or 76.1 degrees Fahrenheit, the microcontroller 301 will modify the frequency of output through the output interface 330 in order to accurately emulate an insect's visual or acoustic communication at that temperature. The ability to modify the pre-set patterns of acoustic or visual communication emitted through the output interface 330 enables the insect decoder and communicator device to adapt and more accurately emulate insect acoustic and visual communication in that particular environment.

In this particular embodiment, when the mode selector 322 is in mode "one," the microcontroller 301 is continuously receiving data from the non-user input 350 regarding the ambient temperature surrounding the insect decoder and communication device. While analyzing the data received from the non-user input 350, the microcontroller 301 modifies the pre-set pattern using the following formula in order to modify the pre-set pattern.

$$C2=|((24.5\ C)-T)/10|$$

Where C2 is the percentage difference in which the frequency of the pre-set pattern is increased or decreased depending on whether temperature T is above or below the base line 24.5 degrees Centigrade, or 76.1 degrees Fahrenheit. The microcontroller 301 increases the pre-set pattern frequency by C2 when the temperature read by the thermistor 352 is above the base line 24.5 degrees Centigrade, or 76.1 degrees Fahrenheit. Similarly, the microcontroller 301 decreases the pre-set pattern frequency by C2 when the temperature read by the thermistor 352 is below the base line 24.5 degrees Centigrade, or 76.1 degrees Fahrenheit.

For example, if the temperature captured by the thermistor 352 is 22.5 degrees Centigrade, the microcontroller 301 will calculate the decrease of the pre-set pattern frequency by calculating the formula as follows C2=|(24.5 C)−22.5 C)/10|. The formula would result in C2 being equal to 0.2, which would result in the microcontroller 301 decreasing the pre-set pattern by twenty (20) percent. As another illustrative example, if the temperature captured by the thermistor 352 is 27.5 degrees Centigrade, the microcontroller 301 will calculate the increase of the pre-set pattern frequency by calculating the formula as follows C2=|(24.5 C)−27.5 C)/10|. In this example, the formula would result in C2 being equal to 0.3, which would result in the microcontroller 301 increasing the pre-set pattern frequency by thirty (30) percent.

The above formula as calculated by the microcontroller 301 using data provided from the thermistor 352 approximately reflects the measure the Q10 coefficient of a particular insect and the appropriate rate of change in an insect's acoustic or visual communication depending on its ambient temperature.

In addition, the microcontroller 301 can modify specific portions of the pre-set pattern. The pre-set rate of pattern consists of timing and duration of when a signal (regardless of whether the signal is acoustic or visual) from the output interface 330 is active and inactive. For certain species of insect, the frequency of inactivity of the visual or acoustic communication is affected by the temperature, while the duration of the visual communication is not. In those instances, the microcontroller 301 will only modify the frequency of the inactivity periods in the pre-set pattern while the activity period in the pre-set pattern will remain constant. The external data source 340 provides the microcontroller 301 the information necessary to determine whether the full pre-set pattern frequency will be altered, or whether the periods of output inactivity will be altered.

The microcontroller 301 continues to modify the pre-set patterns until a cap and floor ambient temperature are met. At fifteen (15) degrees Centigrade (55 degrees Fahrenheit) and lower, the pre-set pattern frequency rate will stay at the modified rate for fifteen (15) degrees Centigrade temperature. Similarly, at thirty (30) degrees Centigrade (86 degrees Fahrenheit) and higher, the pre-set pattern frequency rate will remain at the modified rate for thirty (30) degrees Centigrade temperature. Therefore, at a maximum temperature of thirty (30) degrees Centigrade, the output rate of the pattern from the output interface 330 will be roughly fifty-five (55) percent greater than at the rate of the pre-set baseline temperature. Likewise, at the minimum temperature of fifteen (15) degrees Centigrade, the rate of the pattern from the output interface 330 will be roughly ninety-five (95) percent less than the rate of the pre-set baseline temperature.

Although the present invention has been described in considerable detail with reference to certain preferred embodiments, other embodiments which do not vary from the spirit or scope of this invention are contemplated. Therefore, the appended claims should not be limited to the description of the preferred embodiments contained herein.

It will be apparent to those skilled in the art that various modifications and variations can be made in an insect decoder and communicator device without departing from the spirit or scope of the invention. Thus, it is intended that embodiments of the invention cover the modifications and variations of this invention provided they come within the scope of the appended claims and their equivalents.

What is claimed is:

1. An insect decoder and communicator, comprising:
   a user input interface; a microcontroller; a power source; a non-user input, an output interface; and a communication interface to communicate with external devices, where the user input interface, microcontroller, power source, non-user input, output interface, and communication interface are electronically connected;
   a preset pattern of insect communication from an external device loaded into the microcontroller through the communication interface and stored into memory; and
   the non-user input connected to the microcontroller and causing the microcontroller to modify the frequency of the preset patterns of insect communication produced by the output interface to accurately emulate patterns of insect communications affected by ambient temperature.

2. The insect decoder and communicator of claim 1, wherein the user input interface comprises of a rotary switch, stepping switch, push-button switch, tactile switch, a toggle switch, or an electronic visual display.

3. The insect decoder and communicator of claim 1, wherein the output interface comprises of a light emitting output, an electronic visual display, an audio emitting output, or an indicator light.

4. The insect decoder and communicator of claim 1, wherein the communication interface comprises of an optical reflector detector, a light sensor, a serial port, or a wireless communication interface.

5. The insect decoder and communicator of claim 1, wherein the preset pattern of insect communication stored in the external device reflects the communication pattern of a particular species of insect at a baseline ambient temperature of 24.5 degrees Centigrade.

6. The insect decoder and communicator of claim 1, wherein the microcontroller modifies the frequency of the preset pattern of insect communication to reflect the change of a particular genus of insect affected by ambient temperature by utilizing the formula $C2=|((24.5\ C)-T)/10|$ where T is the ambient temperature detected by the non-user-input and C2 is the percentage of modification of the preset pattern of insect communication.

7. The insect decoder and communicator of claim 6, wherein the microcontroller increases the frequency of the preset pattern of insect communication when T is above 24.5 degrees Centigrade.

8. The insect decoder and communicator of claim 6, wherein the microcontroller decreases the frequency of the preset pattern of insect communication when T is below 24.5 degrees Centigrade.

* * * * *